(12) United States Patent
Urabe et al.

(10) Patent No.: US 11,381,136 B2
(45) Date of Patent: Jul. 5, 2022

(54) VEHICLE DRIVE DEVICE

(71) Applicant: HONDA MOTOR CO., LTD., Tokyo (JP)

(72) Inventors: Eiichiro Urabe, Saitama (JP); Norikazu Kawai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 601 days.

(21) Appl. No.: 16/367,540

(22) Filed: Mar. 28, 2019

(65) Prior Publication Data

US 2019/0305645 A1 Oct. 3, 2019

(30) Foreign Application Priority Data

Mar. 30, 2018 (JP) .............................. JP2018-069970

(51) Int. Cl.
  *H02K 9/193* (2006.01)
  *H02K 5/20* (2006.01)
  *B60K 1/00* (2006.01)

(52) U.S. Cl.
  CPC .............. *H02K 9/193* (2013.01); *B60K 1/00* (2013.01); *H02K 5/20* (2013.01); *B60K 2001/006* (2013.01); *B60Y 2306/05* (2013.01); *B60Y 2400/60* (2013.01)

(58) Field of Classification Search
  CPC . H02K 5/20; H02K 9/19; H02K 9/193; B60K 2001/008; B60K 2001/003; B60K 11/02; B60K 11/00; B60K 1/02; B60K 1/00
  USPC ......................................... 310/52, 54, 58, 59
  See application file for complete search history.

(56) References Cited

U.S. PATENT DOCUMENTS

| | | | |
|---|---|---|---|
| 5,821,653 A | 10/1998 | Kinto et al. | |
| 2008/0035399 A1* | 2/2008 | Murata | H02K 5/20 180/65.51 |
| 2010/0120569 A1 | 5/2010 | Sanji et al. | |
| 2011/0298314 A1 | 12/2011 | Atarashi et al. | |

(Continued)

FOREIGN PATENT DOCUMENTS

| | | |
|---|---|---|
| CN | 101678754 A | 3/2010 |
| CN | 102844969 A | 12/2012 |

(Continued)

OTHER PUBLICATIONS

JP-2013236525-A (English Translation) (Year: 2013).*

(Continued)

*Primary Examiner* — Quyen P Leung
*Assistant Examiner* — Alexander Moraza
(74) *Attorney, Agent, or Firm* — Paratus Law Group, PLLC

(57) ABSTRACT

A vehicle drive device includes: a first rotary electric machine; a second rotary electric machine that is arranged below the first rotary electric machine; and a case having a rotary electric machine housing portion that houses the first rotary electric machine and the second rotary electric machine. The first rotary electric machine and the second rotary electric machine are cooled by a refrigerant flowing inside the case, and in the rotary electric machine housing portion, a guide portion that prevents the refrigerant, which has cooled the first rotary electric machine, from being applied to the second rotary electric machine is provided.

18 Claims, 4 Drawing Sheets

(56) References Cited

U.S. PATENT DOCUMENTS

| | | | | |
|---|---|---|---|---|
| 2013/0088102 A1* | 4/2013 | Zook | ............... | H02K 9/19 310/54 |
| 2013/0169073 A1* | 7/2013 | Nagahama | ......... | H02K 11/0141 310/43 |
| 2014/0097060 A1* | 4/2014 | Hoshinoya | ............... | B60K 6/52 192/85.61 |
| 2014/0125162 A1* | 5/2014 | Tsuchie | ............... | H02K 9/193 310/54 |
| 2015/0022064 A1 | 1/2015 | Yamaguchi et al. | | |
| 2015/0061424 A1* | 3/2015 | Mogi | ............... | H02K 1/32 310/54 |

FOREIGN PATENT DOCUMENTS

| | | |
|---|---|---|
| JP | S60-123456 U | 8/1985 |
| JP | H09-023615 A | 1/1997 |
| JP | H09-226394 A | 9/1997 |
| JP | 2005-083491 A | 3/2005 |
| JP | 2005-201316 A | 7/2005 |
| JP | 2006-312353 A | 11/2006 |
| JP | 2008286247 A * | 11/2008 |
| JP | 2011259634 A * | 12/2011 |
| JP | 2013236525 A * | 11/2013 |
| JP | 2014-103834 A | 6/2014 |
| JP | 2015-020449 A | 2/2015 |

OTHER PUBLICATIONS

JP-2011259634-A (English Translation) (Year: 2011).*
JP-2008286247-A (English Translation) (Year: 2008).*
Nov. 9, 2020, Chinese Office Action issued for related CN Application No. 201910247687.1.
Nov. 2, 2021, Japanese Office Action issued for related JP Application No. 2018-069970.

* cited by examiner

VEHICLE DRIVE DEVICE

CROSS-REFERENCE TO RELATED APPLICATIONS

This application is based on and claims priority under 35 USC 119 from Japanese Patent Application No. 2018-069970 filed on Mar. 30, 2018, the contents of which are incorporated herein by reference.

TECHNICAL FIELD

The present invention relates to a vehicle drive device on which a rotary electric machine is mounted, and particularly to a vehicle drive device on which at least two rotary electric machines are mounted.

BACKGROUND ART

In the related art, a rotary electric machine is mounted as a drive source of a vehicle drive device.

For example, Patent Literature 1 (Japanese Patent Application Laid-Open Publication No. 2015-020449) discloses a vehicle drive device in which two rotary electric machines are coaxially arranged inside a case.

In recent years, further size reduction of a vehicle drive device equipped with this kind of rotary electric machines has been required.

However, in the vehicle drive device disclosed in Patent Literature 1, since the two rotary electric machines are coaxially arranged, it is difficult to shorten the axial length. In addition, when two rotary electric machines are vertically arranged on different axes, an upper rotary electric machine is cooled and a refrigerant whose temperature is raised flows to a lower rotary electric machine, and thus there arises a problem that cooling performance deteriorates.

An object of the present invention is to provide a vehicle drive device capable of preventing a refrigerant that has cooled a first rotary electric machine from flowing into a second rotary electric machine arranged below the first rotary electric machine and efficiently cooling the first rotary electric machine and the second rotary electric machine.

SUMMARY

A vehicle drive device related to the present invention includes: a first rotary electric machine; a second rotary electric machine that is arranged below the first rotary electric machine; and a case having a rotary electric machine housing portion that houses the first rotary electric machine and the second rotary electric machine. The first rotary electric machine and the second rotary electric machine are cooled by a refrigerant flowing inside the case, and in the rotary electric machine housing portion, a guide portion that prevents the refrigerant, which has cooled the first rotary electric machine, from being applied to the second rotary electric machine is provided.

According to the present invention, since the guide portion that prevents the refrigerant that has cooled the first rotary electric machine from being applied to the secondary rotary electric machine is provided in the rotary electric machine housing portion, the high temperature refrigerant cooling the first rotary electric machine is not applied to the second rotary electric machine and cooling performance is improved.

DETAILED DESCRIPTION

Hereinafter, an embodiment of a vehicle drive device of the present invention will be described with reference to FIGS. 1 to 4.

Figure 1:
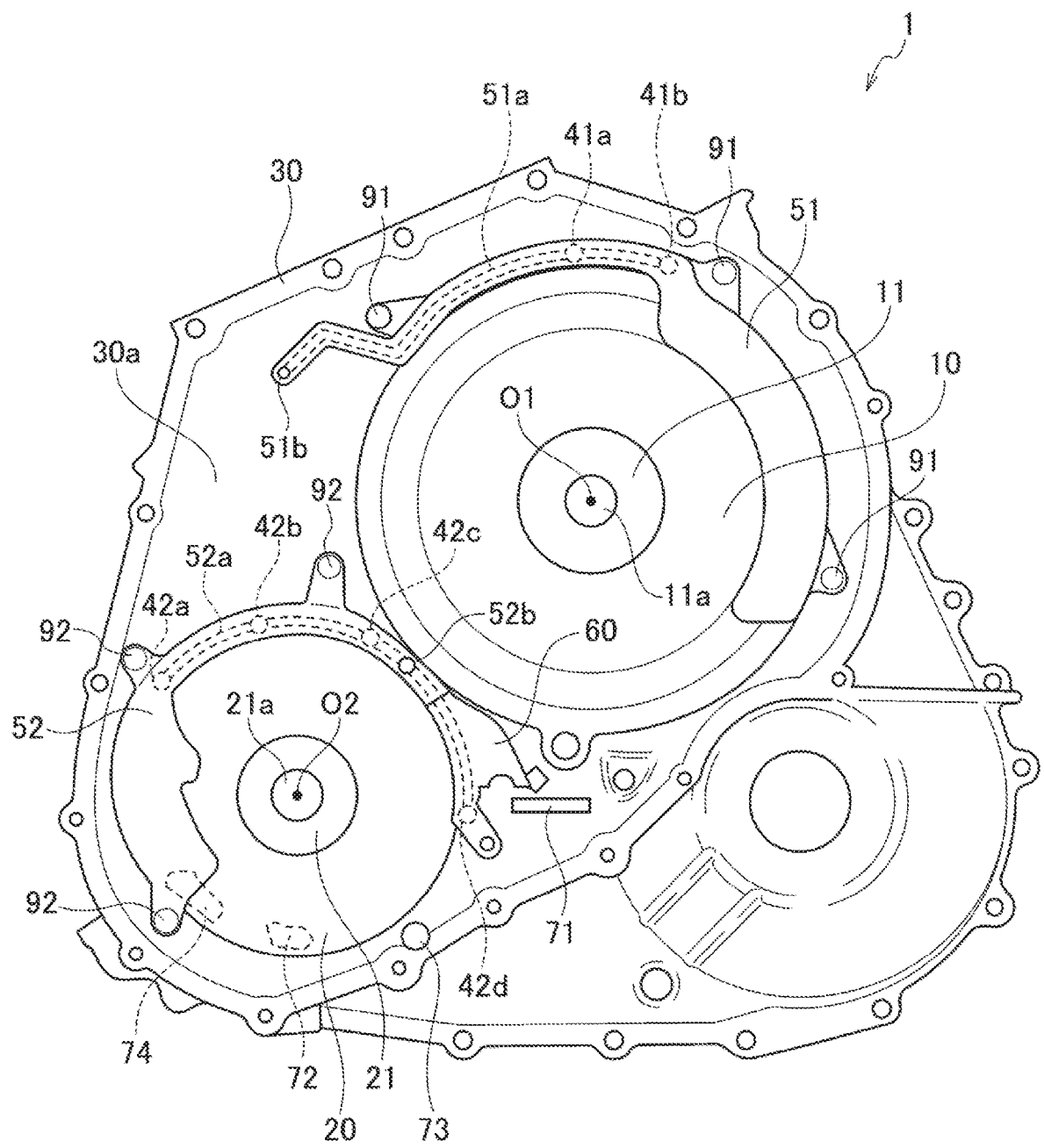
FIG. 1 is a side view illustrating a first rotary electric machine and a second rotary electric machine in a case of a vehicle drive device according to an embodiment of the present invention as seen from a rotation shaft direction.
Figure 2:
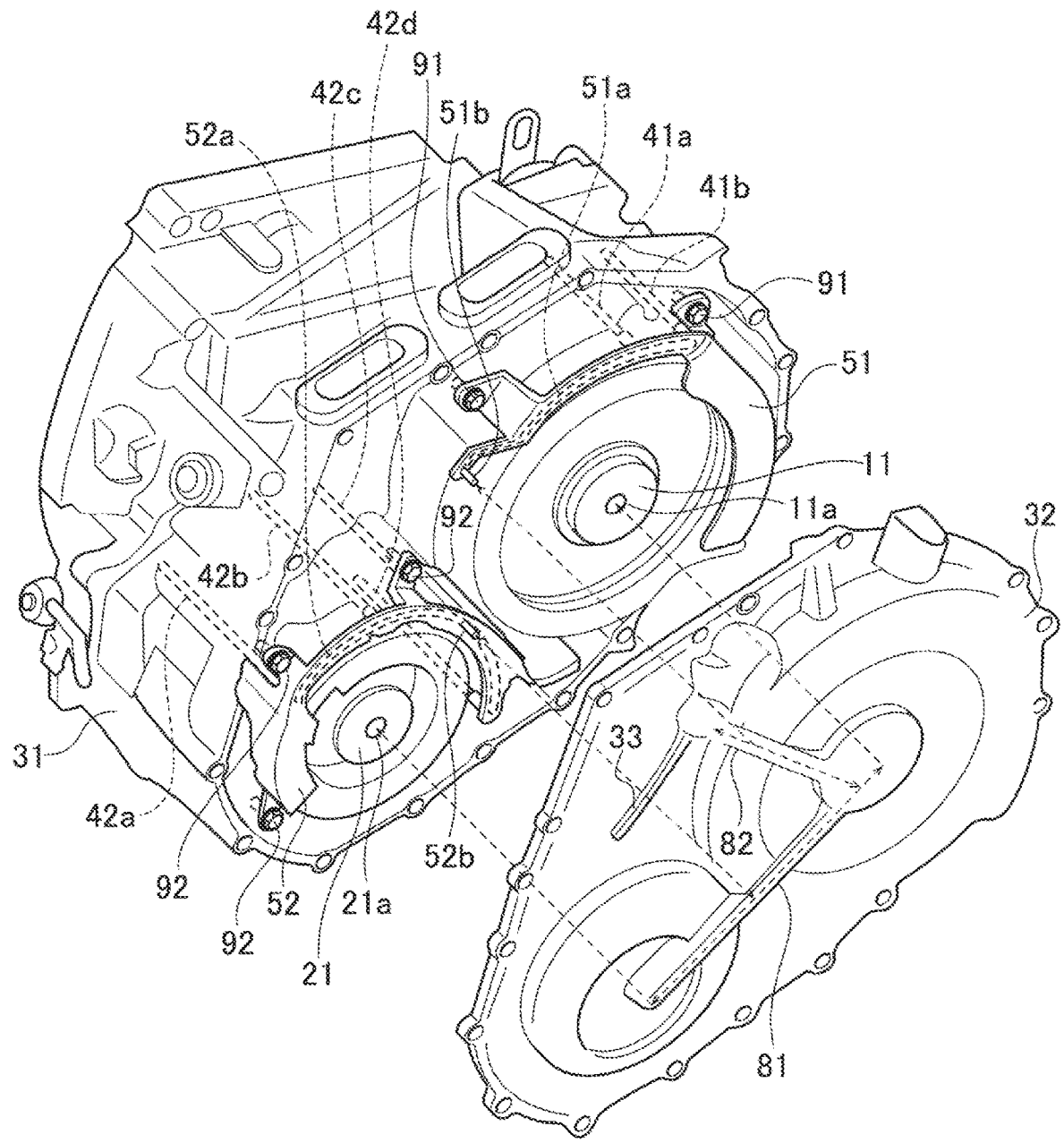
FIG. 2 is a perspective view illustrating the vehicle drive device in FIG. 1 as seen obliquely from above when a case cover is separated from a case main body.

As illustrated in FIGS. 1 and 2, a vehicle drive device 1 according to an embodiment includes a motor 10, a generator 20 that is arranged below the motor 10, and a case 30 that houses the motor 10 and the generator 20.

The case 30 includes a bottomed cylindrical case main body 31, and a case cover 32 that seals an opening of the case main body 31, and the motor 10 and the generator 20 are housed in a rotary electric machine housing portion 30a.

The motor 10 and the generator 20 are arranged such that a rotation shaft O1 of the motor 10 and a rotation shaft O2 of the generator 20 are parallel to each other and the motor and the generator partially overlap with each other in a vertical direction.

On the outer periphery of the motor 10, two first cooling pipes 41a and 41b extending parallel to the rotation shaft O1 of the motor 10 are arranged and on the outer periphery of the generator 20, four second cooling pipes 42a, 42b, 42c, and 42d extending in parallel to the rotation shaft O2 of the generator 20 are arranged.

The first cooling pipes 41a and 41b are supported by a first support portion 51 fixed to the case main body 31 by bolts 91. The first support portion 51 has a circular arc shape along the outer periphery of the motor 10, and a first refrigerant flow path 51a communicating with the first cooling pipes 41a and 41b is formed therein.

The second cooling pipes 42a, 42b, 42c, and 42d are supported by a second support portion 52 fixed to the case main body 31 by bolts 92. The second support portion 52 has a circular arc shape along the outer periphery of the generator 20, and a second refrigerant flow path 52a communicating with the second cooling pipes 42a, 42b, 42c, and 42d is formed therein.

Further, in a region in which the motor 10 and the generator 20 overlap with each other in the vertical direction, a guide portion 60 integrally formed with the second support portion 52 is provided so as to traverse the region.

Figure 3:
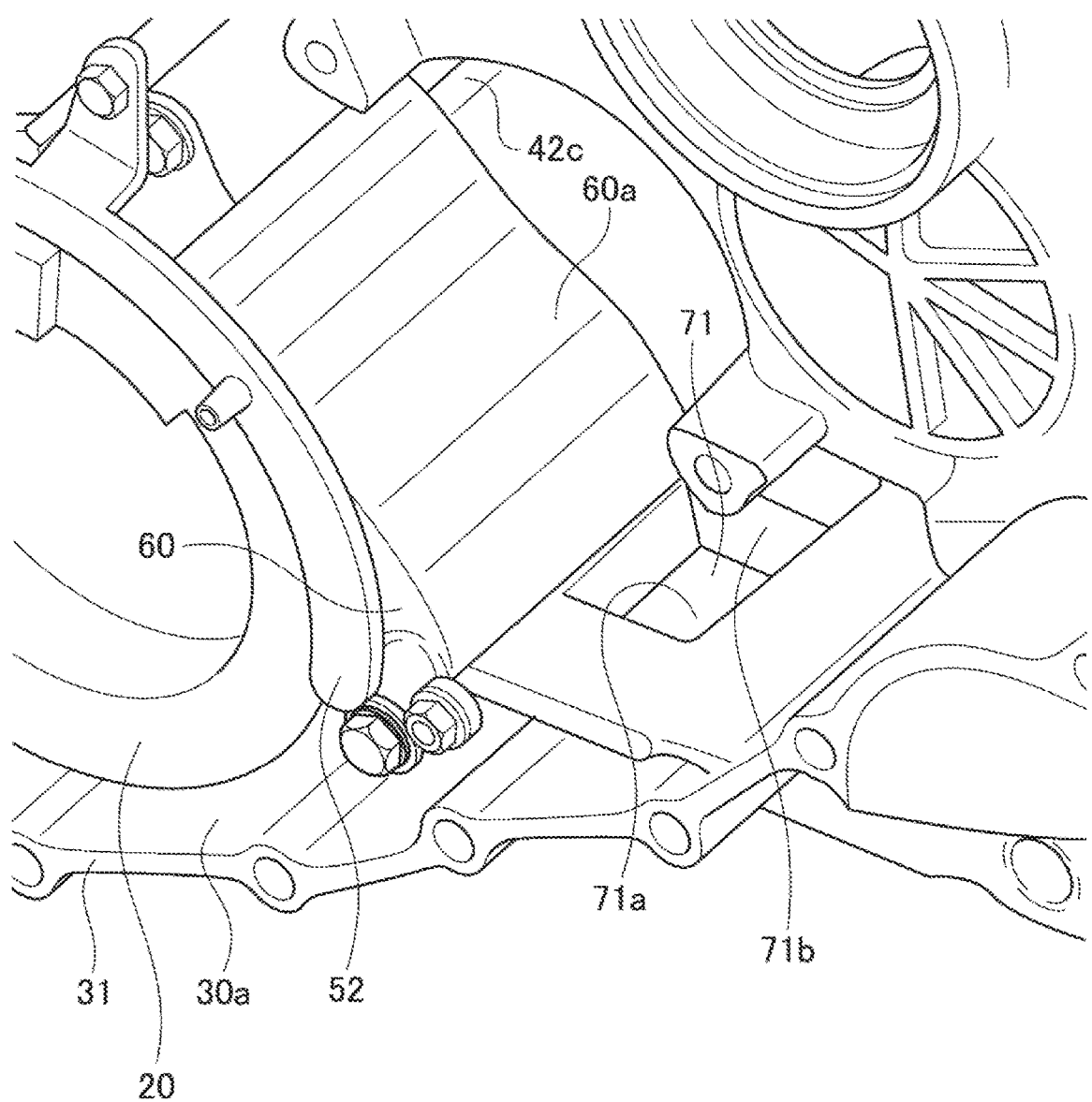
FIG. 3 is an enlarged perspective view of the periphery of a guide portion in FIG. 1.

As illustrated in FIG. 3, the guide portion 60 is a member extending from the outer peripheral side end surface of the second support portion 52 in parallel with the rotation shaft O2 of the generator 20, and is formed integrally with the second support portion 52. In addition, a surface 60a of the guide portion 60 facing the motor 10 has a shape that leads the refrigerant in a direction away from the generator 20.

Further, an upper end side of the guide portion 60 is formed to cover a part of the second cooling pipe 42c, so that the upper end side of the guide portion is unitized with the second support portion 52. In this manner, since the upper end side of the guide portion 60 is supported by the second cooling pipe 42c in addition to the second support portion 52, deformation of the guide portion 60 can be suppressed.

In addition, when the vehicle drive device 1 is manufactured, the second support portion 52 with which is integrally formed with the guide portion 60, and the second cooling pipes 42a, 42b, 42c, and 42d are assembled in advance to be unitized. Thus, the guide portion 60 can be easily assembled with the case main body 31.

It is preferable that the first support portion 51, the second support portion 52, and the guide portion 60 are made of resin. Thus, the first support portion 51, the second support portion 52, and the guide portion 60 can be easily molded, and weight reduction can be achieved.

In the rotary electric machine housing portion 30a of the case 30, a first refrigerant return port 71 is provided below and preferably immediately below the motor 10, and a second refrigerant return port 72 is provided at the lowermost portion of the rotary electric machine housing portion 30a, and preferably at the lowermost portion of the generator 20. Further, a third refrigerant return port 73 is provided below the guide portion 60. Here, a filtration device (not shown) for removing foreign matters contained in a refrigerant is provided in the vicinity of the third refrigerant return port 73 outside the rotary electric machine housing portion 30a of the case 30.

As illustrated in FIG. 3, the first refrigerant return port 71 includes a liquid receiving portion 71a having a dent shape extending along the other end side of the guide portion 60, and a discharge hole 71b for discharging the refrigerant flowing into the liquid receiving portion 71a to the outside of the rotary electric machine housing portion 30a. Therefore, the refrigerant that cools the motor 10 and flows down from the region overlapping with the generator 20 in the vertical direction travels along the surface 60a of the guide portion 60 facing the motor 10, flows from the other end side of the guide portion 60 to the liquid receiving portion 71a of the first refrigerant return port 71, is discharged from the discharge hole 71b to the outside of the rotary electric machine housing portion 30a, and is returned to a refrigerant pump.

In addition, a fourth refrigerant return port 74 is provided on the side facing the third refrigerant return port 73 with respect to the vertical plane passing through the rotation shaft O2 of the generator 20. Both the third refrigerant return port 73 and the fourth refrigerant return port 74 are arranged below the first refrigerant return port 71.

Figure 4:
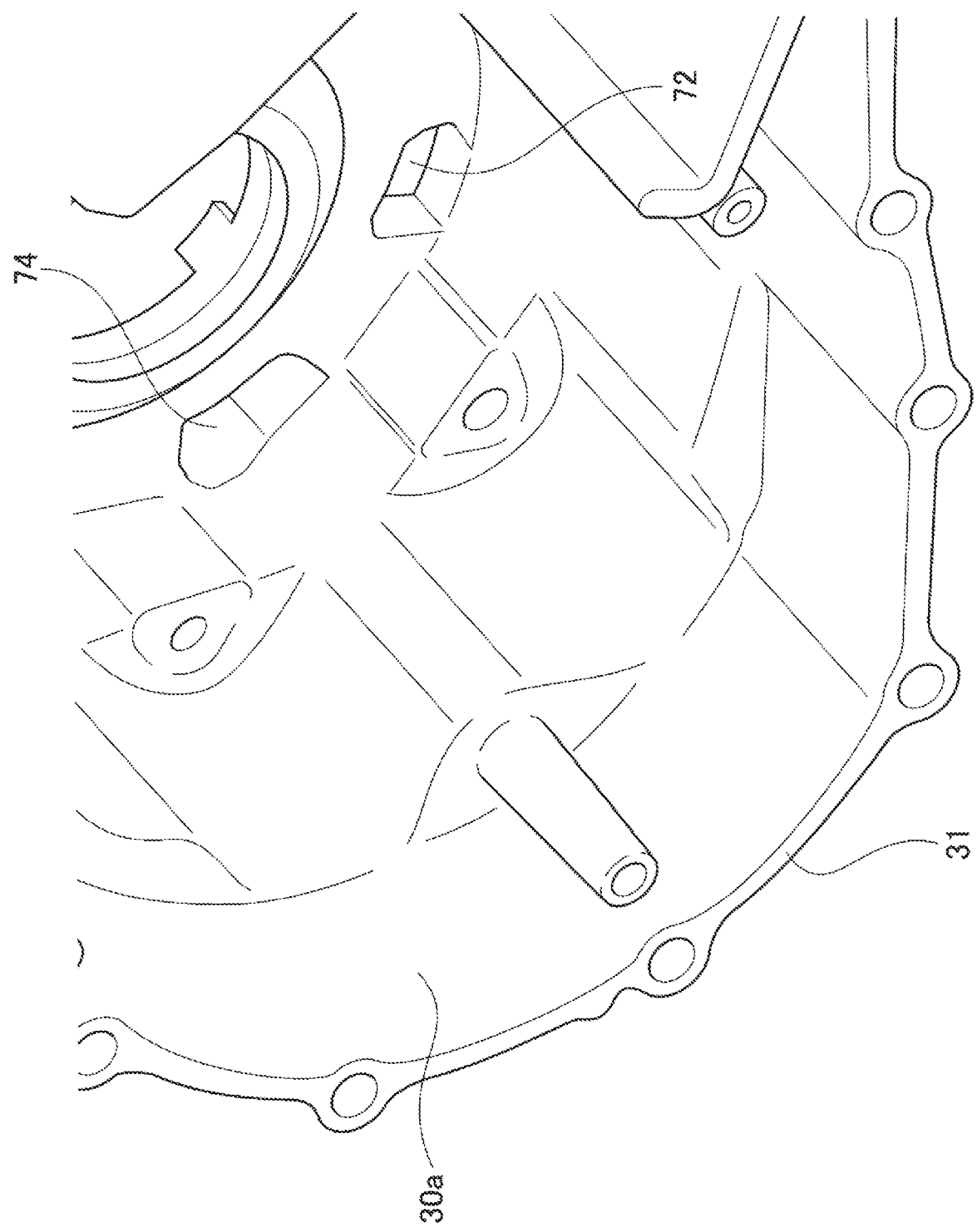
FIG. 4 is an enlarged perspective view illustrating the periphery of a second refrigerant return port and a fourth refrigerant return port in FIG. 1.

As illustrated in FIG. 4, in the case main body 31, the second refrigerant return port 72 is provided on a wall surface in the lowermost portion of the rotary electric machine housing portion 30a, specifically, a wall surface in the lowermost portion on which the generator 20 is arranged. The second refrigerant return port 72 is a hole that is provided on the wall surface of the case main body 31 and communicates with the outside of the rotary electric machine housing portion 30a. The refrigerant discharged from the second cooling pipes 42a, 42b, 42c, and 42d cools the generator 20, then flows on the wall surface of the case main body 31 toward the lowermost portion of the generator 20, is discharged from the second refrigerant return port 72 to the outside of the rotary electric machine housing portion 30a, and is returned to the refrigerant pump.

Further, in the case main body 31, the fourth refrigerant return port 74 is provided on the upper wall surface of the second refrigerant return port 72 on the side facing the third refrigerant return port 73 with respect to the vertical plane passing through the rotation shaft O2 of the generator 20. The fourth refrigerant return port 74 is a hole that is provided on the wall surface of the case main body 31 and communicates with the outside of the rotary electric machine housing portion 30a. The fourth refrigerant return port 74 is preferably provided at a position close to the outer peripheral surface of the generator 20. Some of the refrigerant discharged from the second cooling pipes 42a, 42b, 42c, and 42d cools the generator 20, then flows on the wall surface of the case main body 31 toward the lowermost portion of the generator 20, is discharged from the fourth refrigerant return port 74 to the outside of the rotary electric machine housing portion 30a, and is returned to the refrigerant pump.

Returning to FIG. 2, in the case cover 32, a refrigerant introduction port 33 to which a refrigerant is supplied from the outside, a refrigerant introduction path 82 that is connected to the refrigerant introduction port 33, and a refrigerant communication path 81 that is connected to the refrigerant introduction path 82 are provided.

One end of the refrigerant introduction path 82 is connected to the refrigerant introduction port 33 and the other end is connected to the refrigerant communication path 81. Further, the refrigerant introduction path 82 is connected to a first refrigerant supply hole 51b that is branched from the refrigerant introduction path 82 and provided for supplying the refrigerant to the first refrigerant flow path 51a.

One end of the refrigerant communication path 81 is connected to a first shaft inner refrigerant flow path 11a and the other end is connected to a second shaft inner refrigerant flow path 21a. Further, the refrigerant communication path 81 is connected to a second refrigerant supply hole 52b that is branched from the refrigerant communication path 81 and provided for supplying the refrigerant to the second refrigerant flow path 52a.

The refrigerant is introduced into the case 30 from the outside of the case 30 through the refrigerant introduction port 33, some of the refrigerant is guided to the refrigerant communication path 81 through the refrigerant introduction path 82, and some of the refrigerant is supplied from the first refrigerant supply hole 51b to the first cooling pipes 41a and 41b through the first refrigerant flow path 51a. Some of the refrigerant guided to the refrigerant communication path 81 is supplied from both ends of the refrigerant communication path 81 to the first shaft inner refrigerant flow path 11a and the second shaft inner refrigerant flow path 21a, and some of the refrigerant is supplied from the second refrigerant supply hole 52b to the second cooling pipes 42a, 42b, 42c, and 42d through the second refrigerant flow path 52a.

The refrigerant supplied to the first shaft inner refrigerant flow path 11a passes through the inside of the motor 10, cools the motor 10, and then is discharged to the outside of the motor 10. The refrigerant supplied to the second shaft inner refrigerant flow path 21a passes through the inside of the generator 20, cools the generator 20, and then is discharged to the outside of the generator 20.

The refrigerant supplied to the first cooling pipes 41a and 41b is discharged from refrigerant discharge holes (not shown) provided in the first cooling pipes 41a and 41b toward the motor 10, and cools the motor 10, in addition, the refrigerant supplied to the second cooling pipes 42a, 42b, 42c, and 42d is discharged from refrigerant discharge holes (not shown) provided in the second cooling pipes 42a, 42b, 42c, and 42d toward the generator 20 and cools the generator 20.

Thus, since the motor 10 and the generator 20 are cooled from both inside and outside, the cooling performance is improved. Further, the refrigerant for cooling the motor 10 and the refrigerant for cooling the generator 20 can be separated, and thus the cooling performance is improved.

Returning to FIG. 1, the refrigerant discharged from the first cooling pipes 41a and 41b flows mainly along the outer peripheral side of the motor 10, cools the motor 10, and then flows down from the motor 10. Here, the refrigerant flowing down from the region of the motor 10 overlapping with the generator 20 in the vertical direction does not flow to the generator 20, is recovered by the first refrigerant return port 71 by the guide portion 60, and is returned to a refrigerant pump (not shown) provided outside the rotary electric machine housing portion 30*a*.

Thus, the high temperature refrigerant cooling the motor 10 can be prevented from flowing to the generator 20. That is, since the motor 10 is directly cooled by the refrigerant discharged from the first cooling pipes 41*a* and 41*b*, and the generator 20 is directly cooled by the refrigerant discharged from the second cooling pipes 42*a*, 42*b*, 42*c*, and 42*d*, the cooling performance is improved.

Further, since the refrigerant that has cooled the motor 10 is recovered by the first refrigerant return port 71 before dropping to the lowermost portion of the rotary electric machine housing portion 30*a* and is returned to the refrigerant pump provided outside the rotary electric machine housing portion 30*a*, it is possible to shorten the length of circulation of the refrigerant and to suppress the aeration of the refrigerant.

The refrigerant discharged from the second cooling pipes 42*a*, 42*b*, 42*c*, and 42*d* flows mainly along the outer peripheral side of the generator 20, cools the generator 20, and then is recovered by any of the second refrigerant return port 72, the third refrigerant return port 73, and the fourth refrigerant return port 74. The refrigerant recovered by the second refrigerant return port 72 and the fourth refrigerant return port 74 is returned to the refrigerant pump provided outside the rotary electric machine housing portion 30*a*. The refrigerant recovered by the third refrigerant return port 73 is supplied to a filtration device provided outside the rotary electric machine housing portion 30*a* through the refrigerant flow path leading to the filtration device communicating with the third refrigerant return port 73.

Since the second refrigerant return port 72, the third refrigerant return port 73, and the fourth refrigerant return port 74 are arranged below the first refrigerant return port 71, more refrigerant that has cooled the motor 10 and the generator 20 can be efficiently, recovered by the first refrigerant return port 71, the second refrigerant return port 72, the third refrigerant return port 73, and the fourth refrigerant return port 74 arranged at positions with different heights.

Further, since some of the refrigerant that has cooled the generator 20 is recovered by the third refrigerant return port 73 and is supplied to the filtration device, it is possible to return the refrigerant to the filtration device by a short route.

In addition, it is possible to recover the refrigerant that has cooled the generator 20 by the second refrigerant return port 72 provided at the lowermost portion of the generator 20.

Since some of the refrigerant that has cooled the generator 20 is recovered by the fourth refrigerant return port 74 before the second refrigerant return port 72, the length of circulation of the refrigerant can be made shorter than in a case where the refrigerant is recovered at the second refrigerant return port 72.

It should be noted that the above-described embodiment can be appropriately modified, improved, and the like. For example, in the embodiment, the first refrigerant return port 71, the second refrigerant return port 72, the third refrigerant return port 73, and the fourth refrigerant return port 74 recover the refrigerant discharged from the first cooling pipes 41*a* and 41*b* and the second cooling pipes 42*a*, 42*b*, 42*c*, and 42*d*. However, in addition to this configuration, the refrigerant discharged to the outside of the motor 10 after the motor 10 is cooled from the inside through the first shaft inner refrigerant flow path 11*a* and the refrigerant discharged to the outside of the generator 20 after cooling the generator 20 from the inside through the second shaft inner refrigerant flow path 21*a* may be recovered. By doing so, it is possible to simplify the refrigerant flow path outside the case 30, and it is possible to achieve cost reduction and size reduction.

Also, in the specification, at least the following items are described. In the parentheses, the corresponding constituent elements and the like in the above embodiment are shown, but the present invention is not limited thereto.

(1) A vehicle drive device (vehicle drive device 1) including:

a first rotary electric machine (motor 10);

a second rotary electric machine (generator 20) that is arranged below the first rotary electric machine; and a case (case 30) having a rotary electric machine housing portion (rotary electric machine housing portion 30*a*) that houses the first rotary electric machine and the second rotary electric machine, in which the first rotary electric machine and the second rotary electric machine are cooled by a refrigerant flowing inside the case, and in the rotary electric machine housing portion, a guide portion (guide portion 60) that prevents the refrigerant, which has cooled the first rotary electric machine, from being applied to the second rotary electric machine is provided.

According to (1), since the guide portion that prevents the refrigerant, which has cooled the first rotary electric machine, from being applied to the second rotary electric machine is provided in the case, the high temperature refrigerant that has cooled the first rotary electric machine is not applied to the second rotary electric machine and the cooling performance is improved.

(2) The vehicle drive device according to (1), in which the first rotary electric machine and the second rotary electric machine are arranged so as to at least partially overlap with each other in a vertical direction, and the guide portion is arranged in a region in which the first rotary electric machine and the second rotary electric machine overlap with each other in the vertical direction.

According to (2), since the first rotary electric machine and the second rotary electric machine are arranged so as to at least partially overlap with each other in the vertical direction, it is possible to achieve space saving. In addition, since the guide portion is arranged in the region in which the first rotary electric machine and the second rotary electric machine overlap with each other in the vertical direction, it is possible to more reliably prevent the high temperature refrigerant that has cooled the first rotary electric machine from being applied to the second rotary electric machine.

(3) The vehicle drive device according to (1) or (2), in which in the case, a refrigerant return port (first refrigerant return port 71) that recovers the refrigerant is provided below the first rotary electric machine, and the guide portion is arranged so as to guide the refrigerant that has cooled the first rotary electric machine to the refrigerant return port.

According to (3), since the refrigerant return port that recovers the refrigerant is provided below the first rotary electric machine and the guide portion is arranged so as to guide the refrigerant that has cooled the first rotary electric machine to the refrigerant return port, the refrigerant that has cooled the first rotary electric machine is not dropped to the lowermost portion of the case and is recovered from the refrigerant return port. Thus, it is possible to shorten the length of circulation of the refrigerant and to suppress the occurrence of aeration of the refrigerant.

(4) The vehicle drive device according to (1) or (2), in which in the case, a plurality of refrigerant return ports (first refrigerant return port 71, second refrigerant return port 72, third refrigerant return port 73, fourth refrigerant return port 74) that recover the refrigerant are provided, and at least two refrigerant return ports are arranged at positions with different heights.

According to (4), since the plurality of refrigerant return ports that recover the refrigerant are provided in the case and at least two refrigerant return ports are arranged at positions with different heights, it is possible to more efficiently recover the refrigerant from the refrigerant return ports.

(5) The vehicle drive device according to (4), in which at least one refrigerant return port is a first refrigerant return port (first refrigerant return port 71) provided below the first rotary electric machine.

According to (5), since at least one refrigerant return port is the first refrigerant return port provided below the first rotary electric machine, the refrigerant that has cooled the first rotary electric machine is not dropped to the lowermost portion of the case and is recovered from the first rotary electric machine. Thus, it is possible to shorten the length of circulation of the refrigerant.

(6) The vehicle drive device according to (5), in which the guide portion is arranged so as to guide the refrigerant that has cooled the first rotary electric machine to the first refrigerant return port.

According to (6), since the guide portion is arranged so as to guide the refrigerant that has cooled the first rotary electric machine to the first refrigerant return port, it is possible to more reliably recover the refrigerant that has cooled the first rotary electric machine from the first refrigerant return port.

(7) The vehicle drive device according to (5) or (6), in which the plurality of other refrigerant return ports (second refrigerant return port 72, third refrigerant return port 73, fourth refrigerant return port 74) are provided below the first refrigerant return port.

According to (7), since the plurality of refrigerant return ports are provided below the first refrigerant return port, more refrigerant that has cooled the first rotary electric machine and the second rotary electric machine can be efficiently recovered from these refrigerant return ports.

(8) The vehicle drive device according to any one of (5) to (7), in which at least one refrigerant return port is a second refrigerant return port (second refrigerant return port 72) provided at a lowermost portion of the rotary electric machine housing portion.

According to (8), since at least one refrigerant return port is the second refrigerant return port provided at the lowermost portion of the rotary electric machine housing portion, it is possible to recover the refrigerant that has cooled the second rotary electric machine from the second refrigerant return port.

(9) The vehicle drive device according to any one of (5) to (8), in which at least one refrigerant return port is a third refrigerant return port (third refrigerant return port 73) that is provided below the first refrigerant return port and communicates with a refrigerant flow path which guides the refrigerant to a filtration device provided outside the rotary electric machine housing portion.

According to (9), since at least one refrigerant return port is the third refrigerant return port that is provided below the first refrigerant return port and communicates with a refrigerant flow path which guides the refrigerant to a filtration device provided outside the rotary electric machine housing portion, it is possible to supply the refrigerant to the filtration device by a short route.

(10) The vehicle drive device according to (9), in which at least one refrigerant return port is a fourth refrigerant return port (fourth refrigerant return port 74) that is provided below the first refrigerant return port and is provided on a side facing the third refrigerant return port with respect to a vertical plane passing through a rotation shaft of the second rotary electric machine.

According to (10), since one refrigerant return port is the fourth refrigerant return port that is provided below the first refrigerant return port and is provided on the side facing the third refrigerant return port with respect to the vertical plane passing through the rotation shaft of the second rotary electric machine, the refrigerant flowing on the side facing the third refrigerant return port with respect to the vertical plane passing through the rotation shaft of the second rotary electric machine can be recovered from the fourth refrigerant return port without being dropped to the second refrigerant return port, and the length of circulation of the refrigerant can be made shorter than in a case where the refrigerant is recovered at the second refrigerant return port.

(11) The vehicle drive device according to any one of (1) to (10), in which the case includes a first cooling pipe (first cooling pipes 41a, 41b) arranged on an outer periphery of the first rotary electric machine, and a second cooling pipe (second cooling pipes 42a, 42b, 42c, 42d) arranged on an outer periphery of the second rotary electric machine, and the refrigerant is discharged from the first cooling pipe and the second cooling pipe.

According to (11), since the first rotary electric machine is directly cooled by the refrigerant discharged from the first cooling pipe and the second rotary electric machine is directly cooled by the refrigerant discharged from the second cooling pipe, respectively, the cooling performance is improved.

(12) The vehicle drive device according to (11), in which the guide portion is unitized with the second cooling pipe.

According to (12), the guide portion is unitized with the second cooling pipe. Thus, since the guide portion is supported by the second cooling pipe, it is possible to suppress deformation. In addition, the guide portion can be assembled with the second cooling pipe in advance to be unitized and can be assembled with the case, and the guide portion can be easily assembled with the case main body.

(13) The vehicle drive device according to (11) or (12), in which the second cooling pipe is supported by a support portion (second support portion 52) having a circular arc shape along an outer periphery of the second rotary electric machine, and the guide portion is integrally formed with the support portion and a surface (surface 60a) facing the first rotary electric machine has a shape that leads the refrigerant in a direction away from the second rotary electric machine.

According to (13), since the guide portion is integrally formed with the support portion that supports the second cooling pipe and has a circular arc shape along an outer periphery of the second rotary electric machine, it is possible to suppress deformation of the guide portion. In addition, since the surface of the guide portion facing the first rotary electric machine has a shape that leads the refrigerant in the direction away from the second rotary electric machine, it is possible to guide the refrigerant that has cooled the first rotary electric machine to the first refrigerant return port.

(14) The vehicle drive device according to any one of (11) to (13), in which the first rotary electric machine has a first shaft inner refrigerant flow path (first shaft inner refrigerant flow path 11a) in which the refrigerant flows inside the rotation shaft, and the second rotary electric machine has a second shaft inner refrigerant flow path (second shaft inner refrigerant flow path 21a) in which the refrigerant flows inside the rotation shaft.

According to (14), since the first rotary electric machine has the first shaft inner refrigerant flow path in which the refrigerant flows inside the rotation shaft, and the second rotary electric machine has the second shaft inner refrigerant flow path in which the refrigerant flows inside the rotation shaft, the first rotary electric machine and the second rotary electric machine can be cooled from the inside and thus the cooling performance is improved.

(15) The vehicle drive device according to (14), in which in the case, a refrigerant communication path (refrigerant communication path 81) that communicates with the first shaft inner refrigerant flow path and the second shaft inner refrigerant flow path, a refrigerant introduction path (refrigerant introduction path 82) that guides the refrigerant to the refrigerant communication path from an outside of the case, a first refrigerant flow path (first refrigerant flow path 51a, first refrigerant supply hole 51b) that is branched from the refrigerant introduction path and communicates with the first cooling pipe, and a second refrigerant flow path (second refrigerant flow path 52a, second refrigerant supply hole 52b) that is branched from the refrigerant communication path and communicates with the second cooling pipe are provided.

According to (15), since the refrigerant discharged from the first cooling pipe and the refrigerant flowing in the first shaft inner refrigerant flow path cool the first rotary electric machine, and the refrigerant discharged from the second cooling pipe and the refrigerant flowing the second shaft inner refrigerant flow path cool the second rotary electric machine, the refrigerant for cooling the first rotary electric machine and the refrigerant for cooling the second rotary electric machine can be separated and thus the cooling performance is improved.

(16) The vehicle drive device according to (13), in which in the support portion, a flow path (second refrigerant flow path 52a, second refrigerant supply hole 52b) which guides the refrigerant to the second cooling pipe is formed.

According to (16), since the flow path that guides the refrigerant to the second cooling pipe is formed in the support portion, it is possible to reduce the number of parts.

(17) The vehicle drive device according to any one of (1) to (16), in which the guide portion is made of resin.

According to (17), since the guide portion is made of resin, the guide portion is easily molded and weight reduction can be facilitated.

(18) The vehicle drive device according to any one of (1) to (17), in which the first rotary electric machine is a motor that generates a driving force for a vehicle, and the second rotary electric machine is a generator that generates electricity.

According to (18), since the first rotary electric machine is a motor that generates a driving force for a vehicle and the second rotary electric machine is a generator that generates electricity, it is possible to properly cool each of the two kinds of rotary electric machines having different required cooling performances.

The invention claimed is:

1. A vehicle drive device comprising:
   a first rotary electric machine;
   a second rotary electric machine that is arranged below the first rotary electric machine; and
   a case having a rotary electric machine housing portion that houses the first rotary electric machine and the second rotary electric machine,
   wherein the first rotary electric machine and the second rotary electric machine are cooled by a refrigerant flowing inside the case,
   wherein in the rotary electric machine housing portion, a guide portion that prevents the refrigerant, which has cooled the first rotary electric machine, from being applied to the second rotary electric machine is provided,
   wherein the first rotary electric machine and the second rotary electric machine are arranged so as to at least partially overlap with each other in a vertical direction, and
   wherein the guide portion is arranged in a region in which the first rotary electric machine and the second rotary electric machine overlap with each other in the vertical direction.

2. The vehicle drive device according to claim 1, wherein
   a refrigerant return port that recovers the refrigerant is provided below the first rotary electric machine in the case, and
   the guide portion is arranged so as to guide the refrigerant that has cooled the first rotary electric machine to the refrigerant return port.

3. The vehicle drive device according to claim 1, wherein
   a plurality of refrigerant return ports that recover the refrigerant are provided in the case, and
   at least two refrigerant return ports are arranged at positions with different heights.

4. The vehicle drive device according to claim 3, wherein at least one refrigerant return port is a first refrigerant return port provided below the first rotary electric machine.

5. The vehicle drive device according to claim 4, wherein the guide portion is arranged so as to guide the refrigerant that has cooled the first rotary electric machine to the first refrigerant return port.

6. The vehicle drive device according to claim 4, wherein
   a plurality of refrigerant return ports other than the first refrigerant return port are provided below the first refrigerant return port.

7. The vehicle drive device according to claim 4, wherein
   at least one refrigerant return port is a second refrigerant return port provided at a lowermost portion of the rotary electric machine housing portion.

8. The vehicle drive device according to claim 4, wherein at least one refrigerant return port is a third refrigerant return port that is provided below the first refrigerant return port and communicates with a refrigerant flow path which guides the refrigerant to a filtration device provided outside the rotary electric machine housing portion.

9. The vehicle drive device according to claim 8, wherein at least one refrigerant return port is a fourth refrigerant return port that is provided below the first refrigerant return port and is provided on a side facing the third refrigerant return port with respect to a vertical plane passing through a rotation shaft of the second rotary electric machine.

10. The vehicle drive device according to claim 1, wherein
the case includes
a first cooling pipe arranged on an outer periphery of the first rotary electric machine, and
a second cooling pipe arranged on an outer periphery of the second rotary electric machine, and
the refrigerant is discharged from the first cooling pipe and the second cooling pipe.

11. The vehicle drive device according to claim 10, wherein
the guide portion is unitized with the second cooling pipe.

12. The vehicle drive device according to claim 10, wherein
the second cooling pipe is supported by a support portion having a circular arc shape along an outer periphery of the second rotary electric machine, and
the guide portion is integrally formed with the support portion and a surface facing the first rotary electric machine has a shape that leads the refrigerant in a direction away from the second rotary electric machine.

13. The vehicle drive device according to claim 12, wherein
in the support portion, a flow path that guides the refrigerant to the second cooling pipe is formed.

14. The vehicle drive device according to claim 10, wherein
the first rotary electric machine has a first shaft inner refrigerant flow path in which the refrigerant flows inside the rotation shaft, and
the second rotary electric machine has a second shaft inner refrigerant flow path in which the refrigerant flows inside the rotation shaft.

15. The vehicle drive device according to claim 14, wherein
a refrigerant communication path that communicates with the first shaft inner refrigerant flow path and the second shaft inner refrigerant flow path, a refrigerant introduction path that guides the refrigerant to the refrigerant communication path from an outside of the case, a first refrigerant flow path that is branched from the refrigerant introduction path and communicates with the first cooling pipe, and a second refrigerant flow path that is branched from the refrigerant communication path and communicates with the second cooling pipe are provided in the case.

16. The vehicle drive device according to claim 1, wherein
the guide portion is made of resin.

17. The vehicle drive device according to claim 1, wherein
the first rotary electric machine is a motor that generates a driving force for a vehicle, and
the second rotary electric machine is a generator that generates electricity.

18. The vehicle drive device according to claim 1, wherein at least a part of the guide portion is arranged above a rotation shaft of the second rotary electric machine.

* * * * *